United States Patent [19]

Nakae

[11] 4,309,139

[45] Jan. 5, 1982

[54] SELF-LOCKING FASTENING DEVICE

[75] Inventor: Isoji Nakae, Wakayama, Japan

[73] Assignee: Kishu Neji Co., Ltd., Osaka, Japan

[21] Appl. No.: 127,977

[22] Filed: Mar. 6, 1980

[30] Foreign Application Priority Data

Jul. 29, 1979 [JP] Japan .................. 54-104723

[51] Int. Cl.³ .......................................... F16B 39/282
[52] U.S. Cl. ..................................................... 411/187
[58] Field of Search .............. 411/187, 188, 184, 185, 411/163, 162, 161, 160, 166

[56] References Cited

U.S. PATENT DOCUMENTS

| | | | |
|---|---|---|---|
| 1,355,373 | 10/1920 | White | 411/187 |
| 1,612,955 | 1/1927 | Valberg | 411/160 |
| 2,147,211 | 2/1939 | Olson | 411/187 |
| 3,078,899 | 2/1963 | MacLean et al. | 411/185 |
| 4,220,188 | 9/1980 | McMurray | 411/188 |

Primary Examiner—Ramon S. Britts
Attorney, Agent, or Firm—Wenderoth, Lind & Ponack

[57] ABSTRACT

A fastening device includes a body having an engaging surface and threads concentric with the rotational axis of the body. The engaging surface has formed therein a plurality of ratchet-like projections having a sawtooth-type circumferential cross section. Each projection includes a first radially outer edge and a second radially inner edge which together define a leading point which forms a most prominent portion of the projection. Each first edge of each projection extends along a respective first tangent line of a plurality of first tangent lines which extend from an inner periphery to an outer periphery of the engaging surface in directions tangentially inclined with respect to the radial. Each second edge of each projection extends along a respective second tangent line of a plurality of second tangent lines which extend from the inner periphery to the outer periphery of the engaging surface in directions tangentially inclined with respect to the radial and in a direction of inclination opposite to that of the first tangent lines. The first and second tangent lines are spaced at regular intervals to intersect such that there are formed a plurality of the leading points along each tangent line between the inner and outer peripheries of the engaging surface.

11 Claims, 9 Drawing Figures

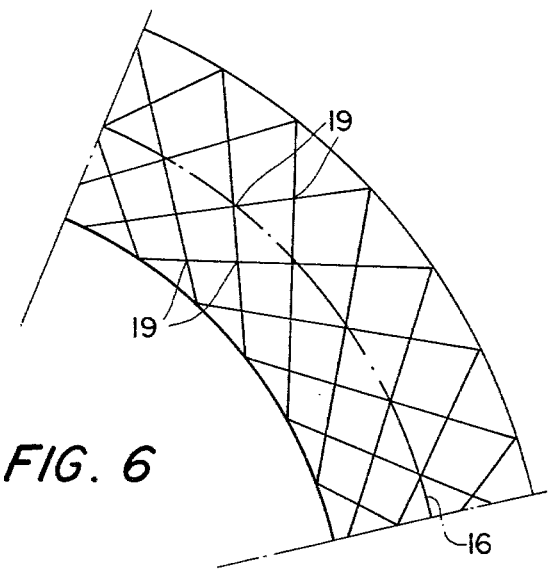
FIG. 6
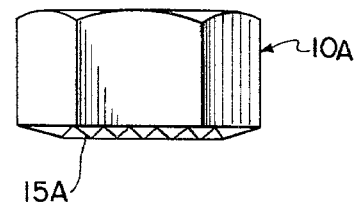
FIG. 7
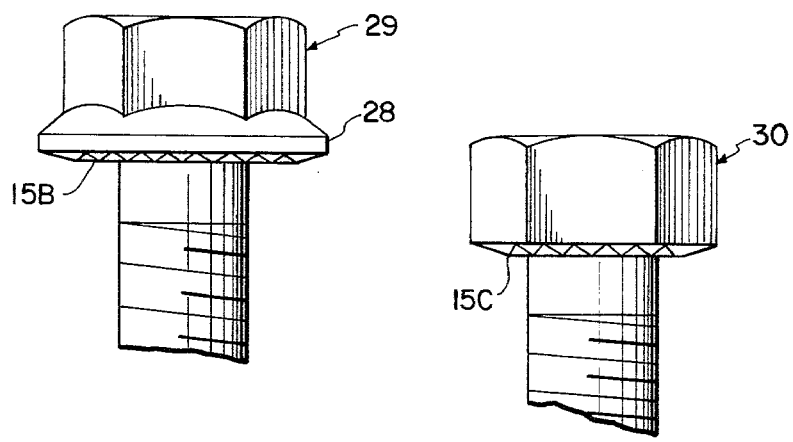
FIG. 8
FIG. 9

SELF-LOCKING FASTENING DEVICE

BACKGROUND AND SUMMARY OF THE INVENTION

The present invention relates to an improved self-locking fastening device having toothed engaging surfaces, and more particularly to improved fastening devices of the type including bolts, nuts and the like having lower engaging surface projections with teeth constructed to afford resistance to loosening of the fastening device, after being brought into pressure engagement with an adjacent surface of a workpiece by the tightening of the fastening device.

An object of the present invention is to provide an improved self-locking fastening device of the nut-type or bolt-type having a toothed engaging surface such that the torque required to loosen the fastening device greatly exceeds the torque required for tightening the fastening device.

Another object of the present invention is to provide such an improved fastening device with an engaging surface having ratchet-like projections in the form of double edges, whereby when the fastening device is turned in a loosening direction an adjacent workpiece surface is cut by the projections and engaged with the latter without abrasion or injury of the points of the projections, thereby obtaining a locking action by the fastening device.

Still another object of the present invention is to provide an integrally formed threaded fastening device having an engaging surface provided with a number of ratchet-like projections including some projections positioned relatively adjacent an outer periphery of the engaging surface and other projections positioned relatively adjacent an inner periphery of the engaging surface. Those projections positioned relatively adjacent the outer periphery of the engaging surface have a construction sufficient to bear a larger portion of the torque load than those projections positioned relatively adjacent the inner periphery of the engaging surface. All of the projections on the engaging surface are capable of engaging with an adjacent workpiece when the fastening device is rotated in a loosening direction.

An even still further object of the present invention is to provide a unique construction of the toothed engaging surface of the fastening device to provide higher release torque to application torque ratio characteristics then generally known lock-nut or bolt-type devices.

BRIEF DESCRIPTION OF THE DRAWINGS

Other objects and advantages of the present invention will become apparent from the following detailed description, with reference to the accompanying drawings, wherein:

FIG. 6 is an enlarged fragmentary end view of a further embodiment of the present invention; and FIGS. 7, 8 and 9 are side views of other embodiments of the present invention, wherein FIG. 7 illustrates an adaptation of a standard nut, FIG. 8 illustrates an adaptation of a bolt having a flanged head, and FIG. 9 illustrates an adaptation of a standard bolt having a head.

DETAILED DESCRIPTION OF THE INVENTION

Figure 1:
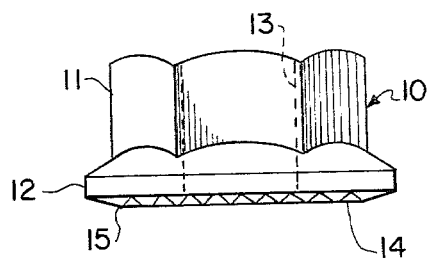
FIG. 1 is a side view showing the adaptation of an embodiment of this invention to a flanged nut.

Referring to the drawings in more detail, like reference numerals have been employed to denote similar parts in the various Figures.

In FIG. 1, there is shown one embodiment of the present invention in the form of a threaded flanged nut 10. The nut 10 includes a body 11 having an annular flange 12 formed at the lower portion of the body, a threaded bore 13 extending through the axis of the body, and an engaging end surface 14 having therein a plurality of ratchet-like projections 15 having a sawtooth-type circumferential cross section.

Each projection 15 includes a first radially outer edge 17 and a second radially inner edge 18 which together form a leading point 19 which is formed at the most prominent area of the projection. All of the leading points 19 which are formed in the engaging surface 14 face in the direction of loosening of the fastening device, as indicated by arrow 21 in FIG. 2 of the drawings.

Each first edge 17 of each projection 15 extends along a respective first tangent line 22 of a plurality of first tangent lines which extend from an inner periphery 25 to an outer periphery 24 of the engaging surface 14. All of the first tangent lines 22 extend in directions tangentially inclined with respect to a direction radially of the rotational axis of the body 11.

Similarly, each second edge 18 of each of the projections 15 extends along a respective second tangent line 23 of a plurality of such second tangent lines which extend from the inner periphery 25 to the outer periphery 24 of the engaging surface 14. All of the second tangent lines 23 extend in directions tangentially inclined with respect to the radial. Also, the dirctions of inclination of second tangent lines 23 are opposite to that of the first tangent lines 22.

Figure 2:
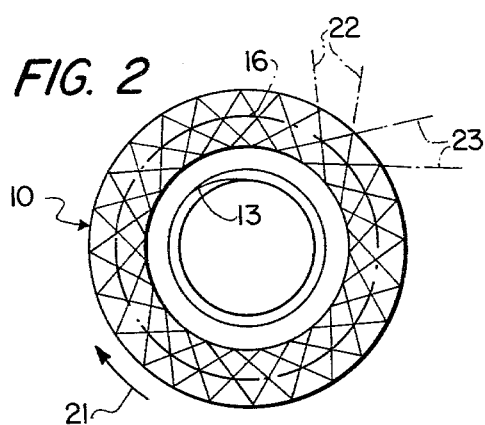
FIG. 2 is an end view of the flanged nut illustrated in FIG. 1.
Figure 4:
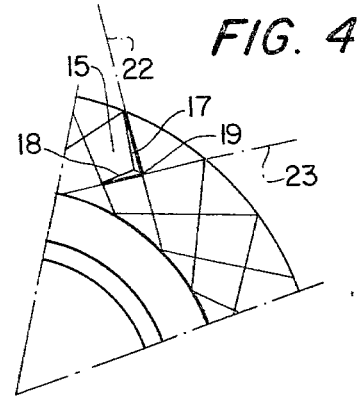
FIG. 4 is a fragmentary end view, similar to FIG. 3, but illustrating in further detail one of the projections and the leading point thereof formed on the engaging surface of the flanged nut.
Figure 3:
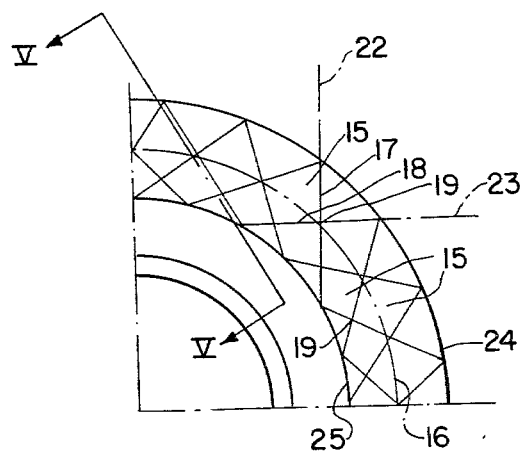
FIG. 3 is a fragmentary enlarged end view of the flanged nut.

The first tangent lines 22 and the second tangent lines 23 are spaced at regular intervals in the circumferential direction of the engaging surface 14 such that each first tangent line 22 intersects a plurality of the second tangent lines 23, and similarly such that each second tangent line 23 intersects a plurality of first tangent lines 22. Thereby, there are formed a plurality of the leading points 29 along each tangent line 22 or 23 between the inner and outer peripheries 25 and 24, respectively, of the engaging surface 14. The intervals between the tangent lines are preferably arranged such that from two to five leading points 19 are formed along each tangent line 22 or 23. In the embodiment of FIGS. 2 and 3 of the drawings, two such leading points 19 are formed along each tangent line 22 or 23. In the embodiment illustrated in FIG. 6 of the drawings, four such leading points 19 are formed along each tangent line 22 or 23.

Preferably the tangent lines 22 and 23 are arranged such that they intersect to form one circumferentially spaced group of leading points 19 which are arranged along an imaginary circular line 16 located approximately centrally between the outer periphery 24 and the inner periphery 25 of the engaging surface 14. Further preferably, the points arranged along imaginary circular line 16 are formed by first edges 17 and second edges 18 which extend at approximately right angles to each other. This relationship is clearly illustrated in FIGS. 2, 3 and 6 of the drawings.

Figure 5:
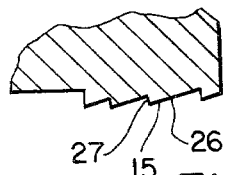
FIG. 5 is a fragmentary sectional view taken along line V—V in FIG. 3.

Further, as will be apparent from FIG. 5 of the drawings, the projections 15 are formed to have a sawtooth-type circumferential cross section, in that each projection 15 is formed by a relatively slightly inclined surface 26 and a pair of steeply inclined surfaces 27, corresponding to edges 17 and 18. Preferably the surface 26 extends at substantially right angles to the surfaces 27.

In operation, it will be understood that the leading points 19 of the projections 15 on the engaging surface 14 serve as spearheads when the nut is turned in the loosening direction shown by arrow 21 in FIG. 2, thereby cutting into the surface of an adjacent workpiece. The points 19 easily bite into the adjacent workpiece by the effect of the double edges 17 and 18 of the projections 15 forming the leading points 19, thereby preventing abrasion or injury of the pointed projections. In addition, each of the projections 15 is compressed from opposite directions by the outer cut material and the inner cut material of the workpiece, so as to cause a wedging effect on the projections, thereby increasing the locking action of the fastening device.

Additionally, as will be apparent particularly from FIGS. 2, 3, 4 and 6 of the drawings, adjacent of the first tangent lines 22 and adjacent of the second tangent lines 23 are positioned closer together adjacent the inner periphery 25 of the engaging surface 14 than at positions adjacent the outer periphery 24 of the engaging surface 14. That is, adjacent of the tangent lines diverge in a generally outward direction. Also as will be apparent from the drawings, the respective first and second edges 17 and 18, respectively, of those projections 15 which are positioned relatively adjacent the outer periphery 24 of the engaging surface 14 have longer dimensions along the respective tangent lines than the first and second edges of those projections which are positioned relatively adjacent the inner periphery 25 of the engaging surface 14. Similarly, the angle between the respective first and second edges 17 and 18, respectively, of each of the projections 15 which is positioned relatively adjacent the outer periphery 24 of the engaging surface 14 is greater than the angle between the respective first and second edges of those projections which are positioned relatively adjacent the inner periphery 25 of the engaging surface 14. Generally, the coefficient of friction of the radially outer portion of the engaging surface 14 is larger than that of the radially inner portion of the engaging surface. Thus, a larger torque will be applied to the radially outer portion of the engaging surface than to the radially inner portion thereof. If all of the projections 15 were uniformly formed and sized, those projections positioned relatively outwardly would be worn away much more rapidly than those projections positioned relatively inwardly. This disadvantage is overcome in accordance with the present invention by the above-discussed configuration of the projections such that the relatively outer projections are larger than the relatively inner projections. Thus, all projections on the engaging surface 14 will be engaged on average with an adjacent workpiece when the fastening device is rotated in the loosening direction 21, thereby obtaining very effective tight locking action of the fastening device.

Referring to FIG. 7, the present invention is shown as adapted to a standard nut 10A in which projections 15A having the same construction as the projections 15 in the first embodiment are provided to achieve the same locking action described above regarding the first embodiment.

FIGS. 8 and 9 also illustrate other embodiments of the present invention in which projections 15B similar to the aforementioned projections 15 of the first embodiment are formed on the lower surface of a flanged head 28 of a bolt 29 in FIG. 8, and projections 15C similar to the projections 15 are adapted to a standard headed bolt 30 in FIG. 9. It will be understood that the bolts illustrated in FIGS. 8 and 9 also will provide the same locking action as described above regarding the aforementioned first embodiment.

Various changes and modifications may be made to the above-described specific embodiments, as will occur to those skilled in the art, without departing from the scope of the present invention.

What I claim is:

1. A fastening device comprising:
a body having a rotational axis, an engaging surface and threads concentric with said axis;
said engaging surface having formed therein and extending therefrom a plurality of ratchet-like projections having a sawtooth-type circumferential cross section;
each said projection including a first radially outer edge and a second radially inner edge which together define a leading point which forms a most prominent portion of said projection;
all of said leading points facing in the direction of loosening of the fastening device;
each said first edge of each said projection extending along a respective first tangent line of a plurality of first tangent lines which extend from an inner periphery to an outer periphery of said engaging surface in directions tangentially inclined with respect to the radial;
each said second edge of each said projection extending along a respective second tangent line of a plurality of second tangent lines which extend from said inner periphery to said outer periphery of said engaging surface in directions tangentially inclined with respect to the radial and in a direction of inclination opposite to that of said first tangent lines; and
said first tangent lines and said second tangent lines being spaced at regular intervals such that each said first tangent line intersects a plurality of said second tangent lines, and such that each said second tangent line intersects a plurality of said first tangent lines, thereby forming a plurality of said leading points along each said tangent line between said inner and outer peripheries of said engaging surface.

2. A fastening device as claimed in claim 1, wherein each said tangent line has formed therealong, between said inner and outer peripheries of said engaging surface, from two to five said leading points.

3. A fastening device as claimed in claim 1, wherein adjacent said first tangent lines and adjacent said second tangent lines are positioned closer together adjacent said inner periphery of said engaging surface than adjacent said outer periphery of said engaging surface.

4. A fastening device as claimed in claims 1 or 2, wherein said engaging surface having said projections is formed on a bottom surface of a flanged nut.

5. A fastening device as claimed in claims 1 or 2, wherein said engaging surface having said projections is formed on a bottom surface of a standard nut.

6. A fastening device as claimed in claims 1 or 2, wherein said engaging surface having said projections is formed on a bottom surface of a flanged head of a flanged head bolt.

7. A fastening device as claimed in claims 1 or 2, wherein said engaging surface having said projections is formed on a bottom surface of a head of a stnadard headed bolt.

8. A fastening device as claimed in claim 1, wherein said first and second edges of those of said projections positioned relatively adjacent said outer periphery of said engaging surface have longer dimensions along said tangent lines than said first and second edges of those of said projections positioned relatively adjacent said inner periphery of said engaging surface.

9. A fastening device as claimed in claim 8, wherein the angle between the respective said first and second edges of each of said projections positoned relatively adjacent said outer periphery of said engaging surface is greater than the angle between the respective said first and second edges of each of said projections positioned relatively adjacent said inner periphery of said engaging surface.

10. A fastening device as claimed in claim 1, wherein said first and second tangent lines are arranged such that they intersect to form a circumferentially spaced group of said leading points which are arranged on an imaginary circular line located approximately centrally between said inner and outer peripheries of said engaging surface.

11. A fastening device as claimed in claim 10, wherein each of said leading points arranged along said imaginary circular line is defined by respective said outer and inner edges which extend at approximately a right angle to each other.

* * * * *